(12) United States Patent
Tominaga

(10) Patent No.: US 7,986,710 B2
(45) Date of Patent: Jul. 26, 2011

(54) COMMUNICATION SYSTEM FOR PROVIDING UPDATABLE INFORMATION VIA POLLING COMMUNICATION

(75) Inventor: Takashi Tominaga, Tokyo (JP)

(73) Assignee: Sony Corporation, Tokyo (JP)

( * ) Notice: Subject to any disclaimer, the term of this patent is extended or adjusted under 35 U.S.C. 154(b) by 296 days.

(21) Appl. No.: 12/150,572

(22) Filed: Apr. 29, 2008

(65) Prior Publication Data

US 2008/0279212 A1    Nov. 13, 2008

(30) Foreign Application Priority Data

May 9, 2007    (JP) ................................. 2007-124133

(51) Int. Cl.
*G06F 9/44* (2006.01)
*G06F 15/16* (2006.01)

(52) U.S. Cl. ......... 370/449; 370/465; 709/203; 717/168
(58) Field of Classification Search ........................ None
See application file for complete search history.

(56) References Cited

U.S. PATENT DOCUMENTS

| | | | | |
|---|---|---|---|---|
| 6,173,323 | B1* | 1/2001 | Moghe ........................... | 709/224 |
| 7,254,605 | B1* | 8/2007 | Strum .......................... | 709/203 |
| 7,398,291 | B2* | 7/2008 | Osias ........................... | 709/203 |
| 7,509,636 | B2* | 3/2009 | McGuire et al. ............. | 717/168 |
| 7,548,969 | B2* | 6/2009 | Tripp et al. .................... | 709/223 |
| 7,653,687 | B2* | 1/2010 | Reisman ........................ | 709/203 |
| 2003/0140092 | A1* | 7/2003 | Caruso et al. ................ | 709/203 |
| 2004/0267878 | A1* | 12/2004 | Osias ........................... | 709/203 |
| 2006/0206607 | A1* | 9/2006 | Carden ........................ | 709/224 |
| 2006/0242320 | A1* | 10/2006 | Nettle et al. .................. | 709/245 |
| 2007/0027987 | A1* | 2/2007 | Tripp et al. ................... | 709/225 |
| 2007/0130255 | A1* | 6/2007 | Wolovitz et al. ............. | 709/204 |
| 2008/0046587 | A1* | 2/2008 | Sakoh et al. .................. | 709/234 |

FOREIGN PATENT DOCUMENTS

| | | |
|---|---|---|
| JP | 11-053274 A | 2/1999 |
| JP | 2002-304363 A | 10/2002 |
| JP | 2003-150240 A | 5/2003 |
| JP | 2003-264748 | 9/2003 |
| JP | 2004-152191 A | 5/2004 |
| JP | 2006-285374 A | 10/2006 |

\* cited by examiner

*Primary Examiner* — Robert C Scheibel
(74) *Attorney, Agent, or Firm* — Wolf, Greenfield & Sacks, P.C.

(57) ABSTRACT

In a communication system, an information processing apparatus communicates with an information management apparatus via polling communication. In the information management apparatus, specification information including information specifying a timing condition of polling communication is stored, and the specification information is transmitted to the information processing apparatus in response to a request from the information processing apparatus. Transmission of the specification information is performed each time the request is issued via polling communication by the information processing apparatus when the specified timing condition is met. In the information processing apparatus, if the specification information is received, the timing condition is set such that next polling communication is performed when the time condition specified by the specification information is met. The polling communication is started when the timing condition set by the setting unit is met to request the provision of specification information specifying the timing condition of further next polling communication.

7 Claims, 8 Drawing Sheets

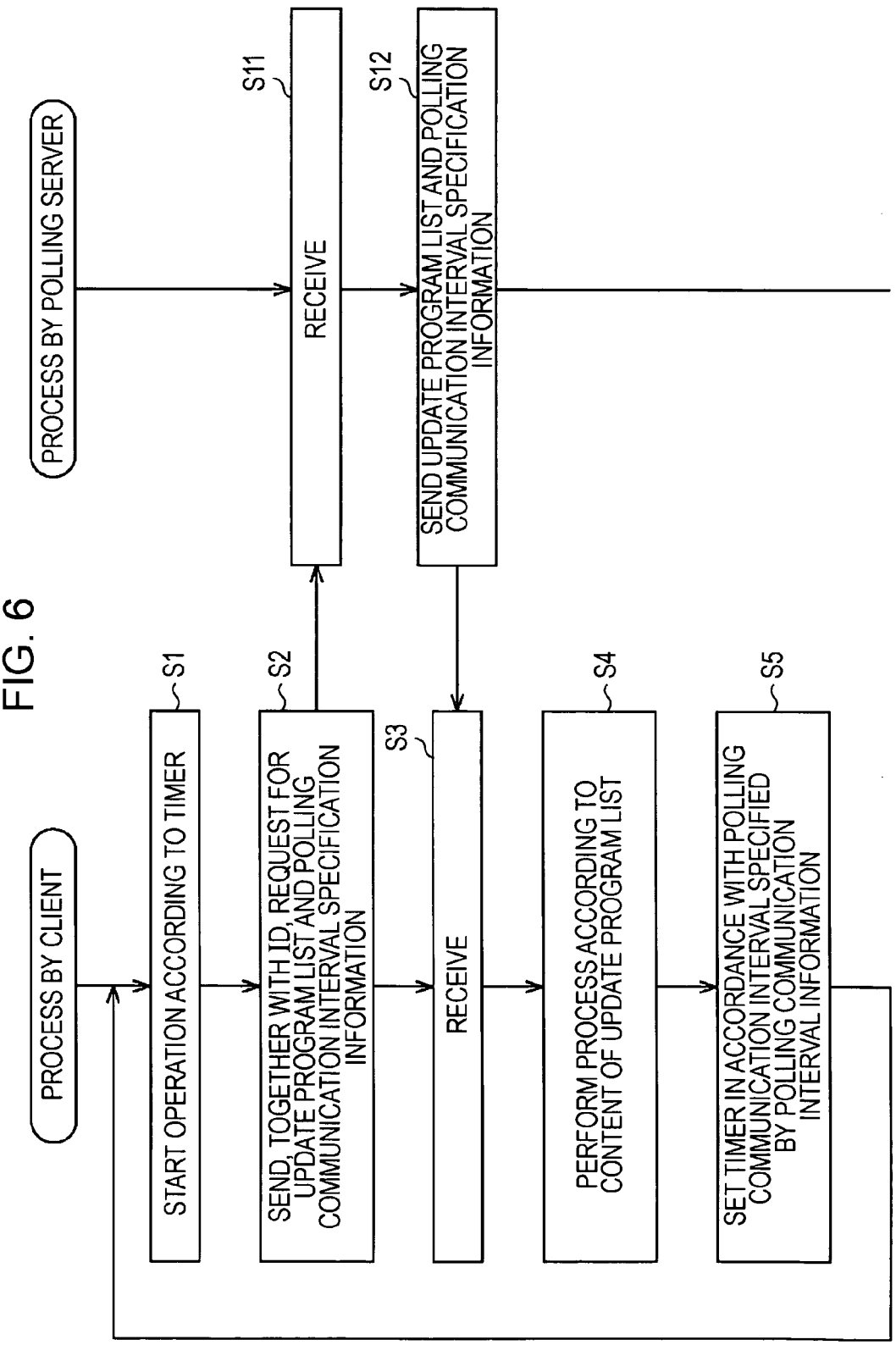

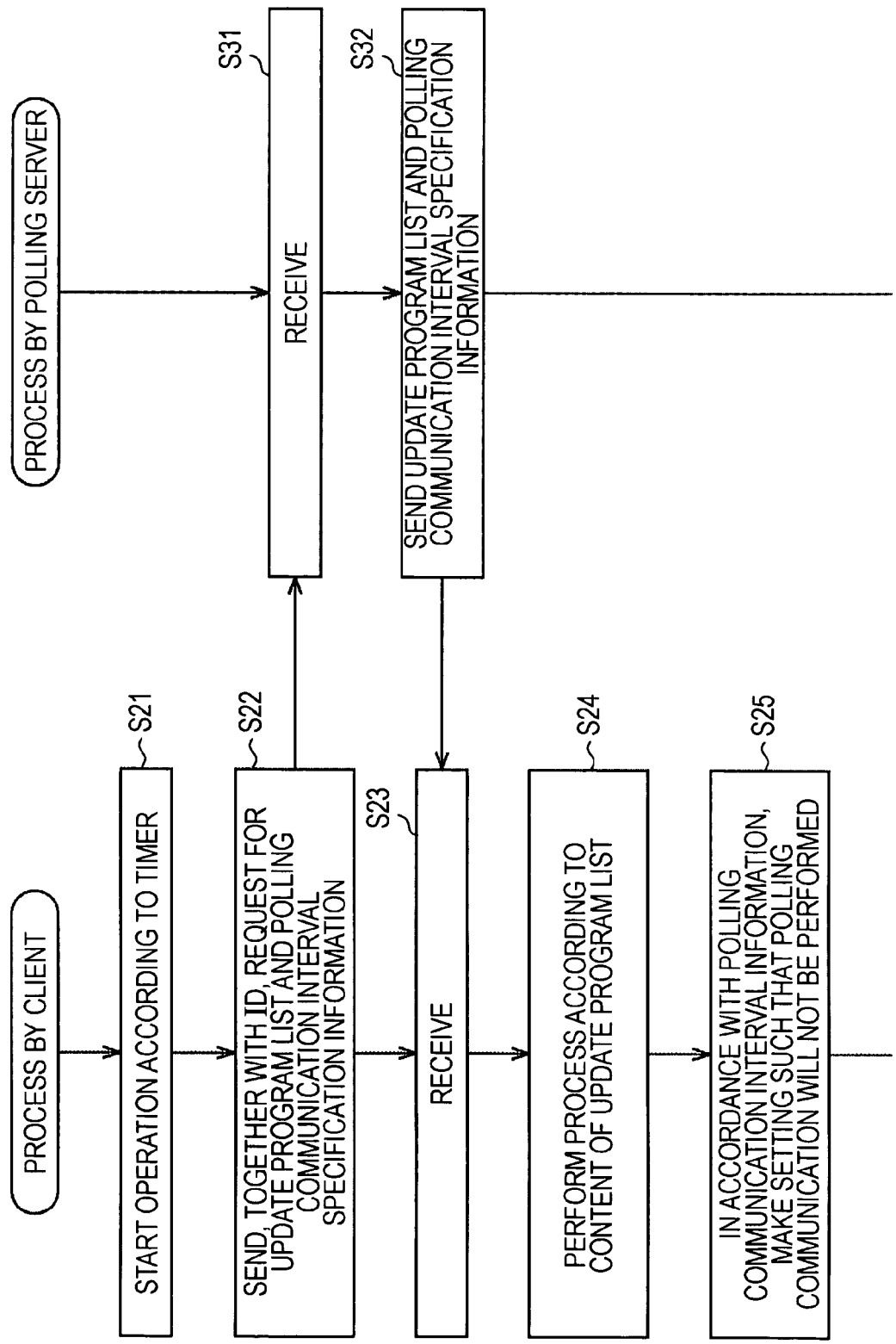

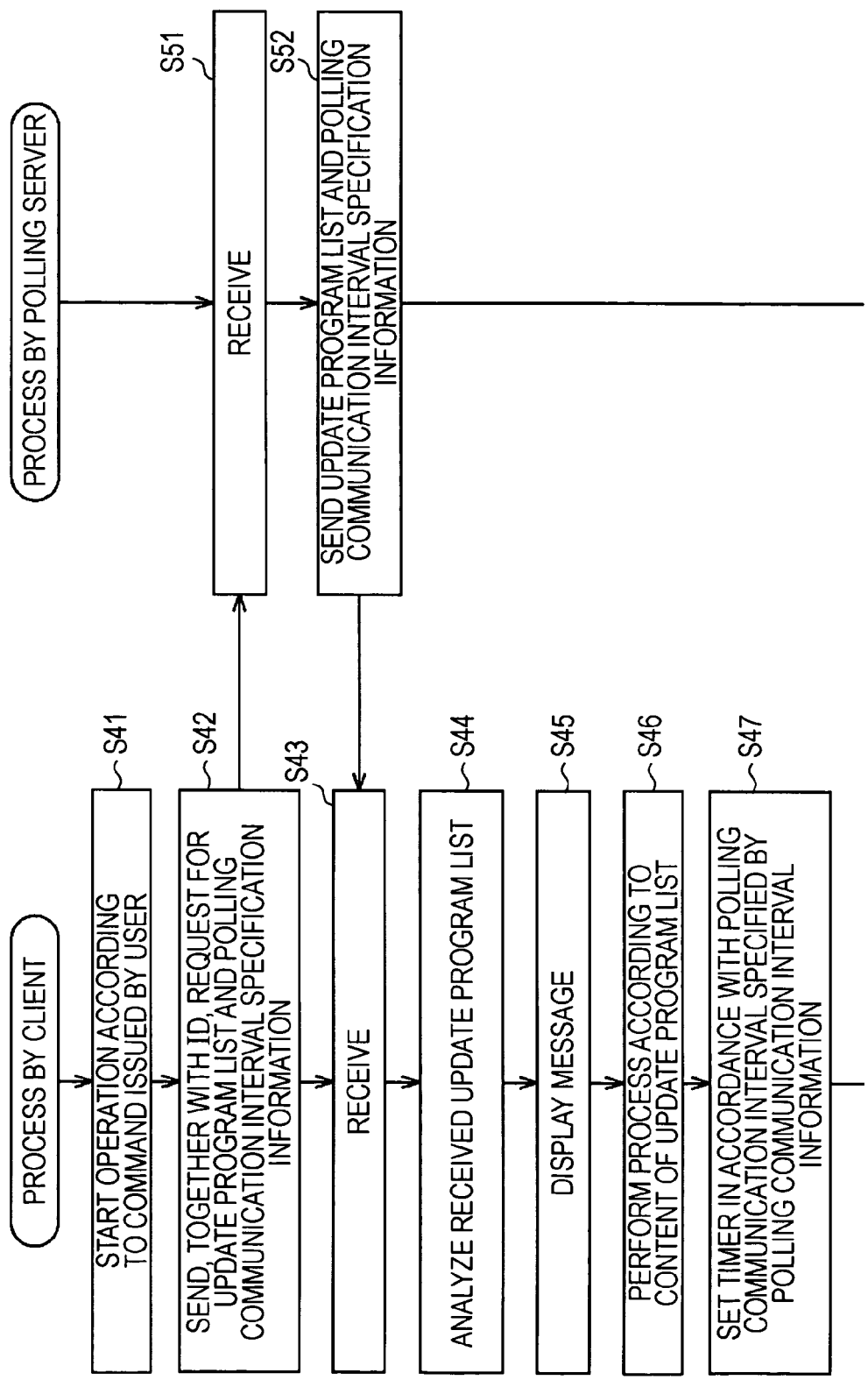

COMMUNICATION SYSTEM FOR PROVIDING UPDATABLE INFORMATION VIA POLLING COMMUNICATION

CROSS REFERENCES TO RELATED APPLICATIONS

The present invention contains subject matter related to Japanese Patent Application JP 2007-124133 filed in the Japanese Patent Office on May 9, 2007, the entire contents of which are incorporated herein by reference.

BACKGROUND OF THE INVENTION

1. Field of the Invention

The present invention relates to a communication system, an information management apparatus, an information management method, an information processing apparatus, and an information processing apparatus, and more particularly, to a communication system, an information management apparatus, an information management method, an information processing apparatus, and an information processing apparatus, capable of easily optimizing polling communication timing.

2. Description of the Related Art

Because of no necessity of complicated mechanisms, polling communication is widely used in communication between a client and a server. In client-server polling communication, a request is periodically issued from a client to a server, and the server responds to the request.

For example, polling communication is used to automatically update a program executed by a client. Each time the specified timing condition of polling communication is met, the client requests the server to provide information. In accordance with the request from the client, the server transmits a list of update programs to the client.

The client analyzes the content of the list. If the analysis indicates that the server has an update version of the program used by the client, the client requests the server to transmit the update version of the program. In response to the request, the server transmits the update version of the program to the client, and the received program is installed on the client. Thus, the program is updated.

Further detailed information on the related technique may be found, for example, Japanese Unexamined Patent Application Publication No. 2003-264748.

SUMMARY OF THE INVENTION

In a case where a function of dynamically controlling the intervals of the polling communication is not available, the client is allowed only to perform polling communication at prespecified constant intervals.

In this case, as the number of clients performing polling communications at the specified intervals increases, the number of accesses to the server increases. To handle increasing accesses while maintaining high quality of service to clients, a corresponding increase in performance of the server is required. However, this leads to an increase in cost.

In actual polling communication performed between clients and the server, an optimal interval varies depending on the situation. However, in the polling communication in which the interval is not dynamically controlled, it is difficult to properly handle a change in situation.

When the specified polling communication internal is shorter than the optimum interval, useless communication occurs. Conversely, when the specified interval is longer than the optimal interval, a delay in communication occurs, which can create a problem in a situation in which quick handling is necessary.

For example, in a case where clients are new products released recently, polling communication at short intervals is necessary for a certain period after the launch of the sale of the products in order to allow programs to be updated to fix bugs or the like. However, after early-stage problems such as bugs are once fixed, polling communication at short intervals is no longer necessary. If the short value is still used as the intervals thereafter, useless communication occurs.

Conversely, if the interval is set to be too longer than the optimal value, polling communication is not started for a long period, although the server is ready to provide the update version of the program. This makes it difficult to quickly handle an urgent problem such as vulnerability detected after the release of the client.

Even in cases where the function of dynamically controlling the polling communication interval is provided, in most cases thereof, the function is implemented not in the server but in the clients, and thus the server is not allowed to optimize the interval depending on the status of the server.

Furthermore, even in a case where the server has the function of controlling the interval, if it is not allowed to control the interval via the polling communication itself, another communication is needed to control the polling communication interval, which leads to an increase in processing load associated with communication. Besides, this method does not guarantee that a change in interval is immediately applied to next polling communication.

In a case where it is not allowed to set a client such that polling communication is deactivated and no further polling communication is performed, the client periodically makes an useless try to perform polling communication even after service provided by the server is terminated and the server is removed. In this case, a user of the client has to handle an error caused by the absence of the server. This is very inconvenient for the user.

Even in the case where the function of terminating polling communication is provided, if the function of re-activating the polling communication from the inactive state is not provided, it is very difficult to re-start the polling communication when it again becomes necessary to perform the polling communication. This is also very inconvenient for the user.

In view of the above, it is desirable to provide a technique of easily optimizing the polling communication timing.

According to an embodiment of the present invention, there is provided a communication system including an information management apparatus and an information processing apparatus, the information processing apparatus being adapted to issue a request to the information management apparatus via polling communication, the information management apparatus being adapted to respond to the request thereby achieving communication between the information processing apparatus and the information management apparatus. The information management apparatus includes a storage unit adapted to store specification information including information specifying a timing condition of polling communication, and a transmitting unit adapted to transmit the specification information stored in the storage unit to the information processing apparatus, in response to the request from the information processing apparatus, wherein the transmitting unit is adapted to transmit the specification information stored in the storage unit to the information processing apparatus each time polling communication is performed, when the timing condition specified in current specification information is met, by the information processing apparatus to issue a request for specification information.

The information processing apparatus includes a setting unit adapted to receive the specification information transmitted from the information management apparatus and set the timing condition of next polling communication such that the next polling communication is performed when the timing condition specified by the specification information is met, and a requesting unit adapted to start polling communication when the timing condition set by the setting unit is met thereby to request the provision of specification information specifying the timing condition of further next polling communication.

According to an embodiment of the present invention, there is provided an information management apparatus adapted to communicate with an information processing apparatus by responding to a request transmitted from the information processing apparatus via polling communication, including a storage unit adapted to store specification information including information specifying a timing condition of polling communication, and a transmitting unit adapted to transmit the specification information stored in the storage unit to the information processing apparatus, in response to the request from the information processing apparatus, wherein the transmitting unit is adapted to transmit the specification information stored in the storage unit to the information processing apparatus each time polling communication is performed, when the timing condition specified in current specification information is met, by the information processing apparatus to issue a request for specification information.

According to an embodiment of the present invention, there is provided an information management method including the steps of storing specification information including information specifying a timing condition of polling communication, and transmitting the stored specification information, in response to a request from an information processing apparatus, wherein transmission of the stored specification information to the information processing apparatus is performed each time polling communication is performed, when the timing condition specified in current specification information is met, by the information processing apparatus to issue a request for specification information.

According to an embodiment of the present invention, there is provided an information processing apparatus adapted to communicate with an information management apparatus having specification information including information specifying a timing condition of polling communication, including a setting unit adapted to receive the specification information transmitted from the information management apparatus and set the timing condition of next polling communication such that the next polling communication is performed when the time condition specified in the received specification information is met, and a requesting unit adapted to start polling communication when the timing condition set by the setting unit is met thereby to request the provision of specification information specifying the timing condition of further next polling communication.

The requesting unit may further request the information management apparatus to provide a list of update programs used for updating a program.

The information processing apparatus may further include an update control unit adapted to control updating of the program such that if the list transmitted from the information management apparatus in response to the request issued by the requesting unit indicates that an update program for use by the information processing apparatus is available from the information management apparatus, then the update control unit requests the information management apparatus to provide the update program and updates the program in accordance with the update program transmitted from the information management apparatus in response to the request.

In a case where the specification information transmitted from the information management apparatus includes information indicating that the polling communication should be deactivated, the setting unit may set the polling communication mode into an inactive mode in which no more polling communication is performed.

In a case where when the polling communication mode is in the inactive mode set by the setting unit such that no more polling communication is performed, if information is input which instructs that the polling communication should be activated, then the requesting unit may perform polling communication and request the provision of specification information specifying the timing condition of next polling communication.

According to an embodiment of the present invention, there is provided an information processing method including the steps of receiving specification information transmitted from an information management apparatus, setting the timing condition of next polling communication such that the next polling communication is performed when the time condition specified by the specification information is met, and starting polling communication when the timing condition set by the setting unit is met thereby to request the provision of specification information specifying the timing condition of further next polling communication.

In the communication system according to the embodiment, in the information management apparatus, specification information including information specifying a polling communication timing is stored, and the stored specification information is transmitted to the information processing apparatus, in response to the request from the information processing apparatus. Transmission of the stored specification information to the information processing apparatus is performed each time polling communication is performed, when the timing condition specified in current specification information is met, by the information processing apparatus to issue a request for specification information. In the information processing apparatus, if the specification information transmitted from the information management apparatus is received, the timing condition of next polling communication is set such that the next polling communication is performed when the timing condition specified by the received specification information is met. When the specified timing condition set by the setting unit is met, the polling communication is started to request the provision of specification information specifying the timing condition of further next polling communication.

In the information management apparatus and information management method according to the embodiment, specification information including information specifying polling communication timing is stored, and the stored specification information is transmitted to the information processing apparatus, in response to the request from the information processing apparatus. Transmission of the stored specification information to the information processing apparatus is performed each time polling communication is performed, when the timing condition specified in current specification information is met, by the information processing apparatus to issue a request for specification information.

In the information processing apparatus and information processing method according to the embodiment, if specification information transmitted from the information management apparatus is received, the timing condition of next polling communication is set such that the next polling communication is performed when the timing condition specified by the received specification information is met. When the specified timing condition set by the setting unit is met, the polling communication is started to request the provision of specification information specifying the timing condition of further next polling communication.

As described above, the prevent invention provides the advantage that the polling communication timing can be easily optimized.

BRIEF DESCRIPTION OF THE DRAWINGS

FIG. 6 is a flow chart illustrating a process performed by a client and a polling server;

FIG. 7 is a flow chart illustrating a process performed by a client and a polling server; and FIG. 8 is a flow chart illustrating a process performed by a client and a polling server.

DESCRIPTION OF THE PREFERRED EMBODIMENTS

Figure 1:
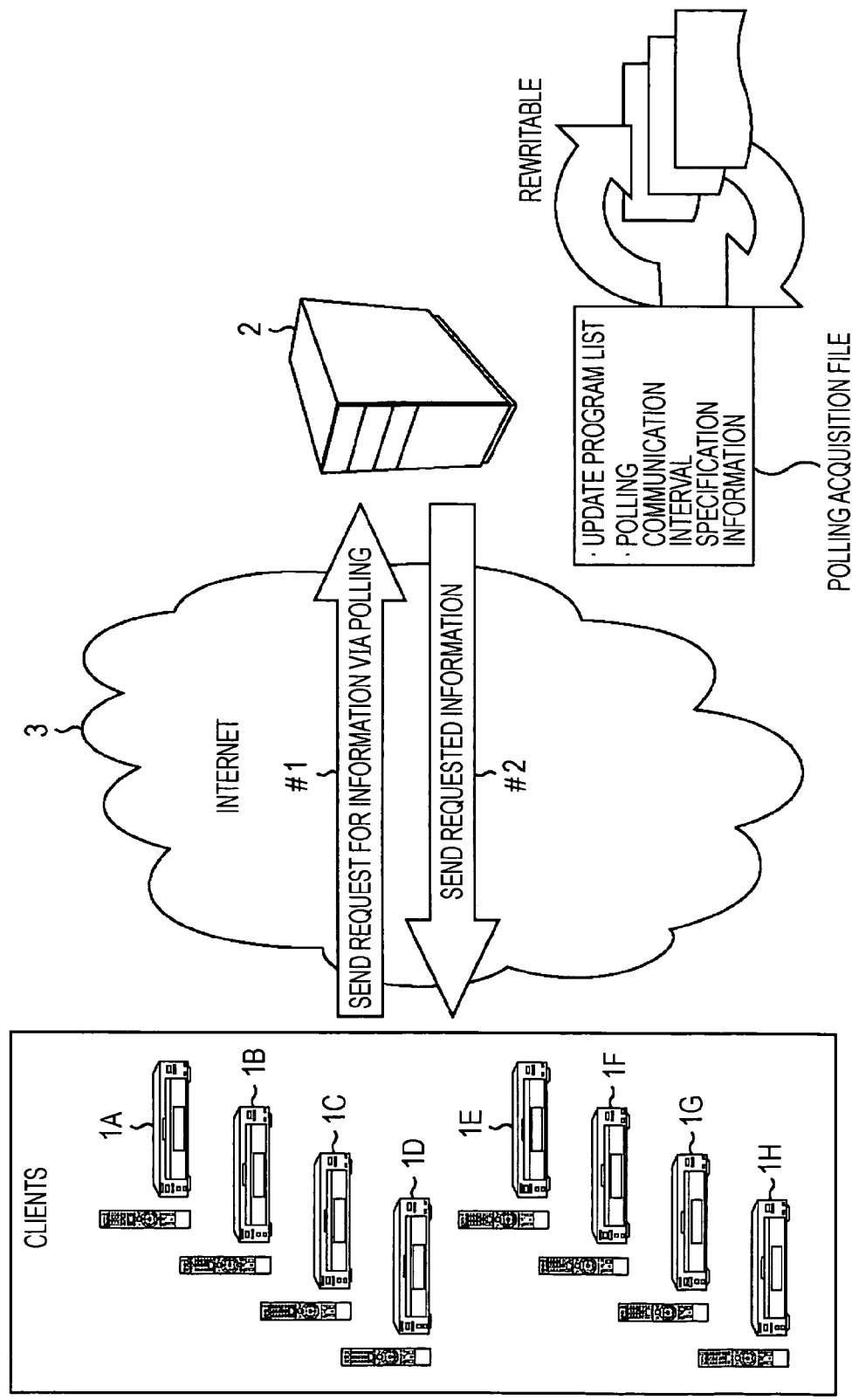
FIG. 1 is a diagram illustrating an example of a communications system according to an embodiment of the present invention.

Before describing an embodiment of the present invention, the correspondence between the features of the invention and the specific elements disclosed in embodiments of the present invention is discussed below. This description is intended to assure that embodiments supporting the invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the invention, that does not necessarily mean that the element does not relate to other features of the invention.

According to an embodiment of the present invention, there is provided a communication system including an information management apparatus (for example, a polling server 2 shown in FIG. 1) and an information processing apparatus (for example, a client 1A (shown in FIG. 1)), the information processing apparatus being adapted to issue a request to the information management apparatus via polling communication, the information management apparatus being adapted to respond to the request thereby achieving communication between the information processing apparatus and the information management apparatus. The information management apparatus includes a storage unit (for example, a polling acquisition file storage unit 62 shown in FIG. 5) adapted to store specification information including information specifying a timing condition of polling communication, and a transmitting unit (for example, a communication controller 61 shown in FIG. 5) adapted to transmit the specification information stored in the storage unit to the information processing apparatus, in response to the request from the information processing apparatus, wherein the transmitting unit is adapted to transmit the specification information stored in the storage unit to the information processing apparatus each time polling communication is performed, when the timing condition specified in current specification information is met, by the information processing apparatus to issue a request for specification information.

The information processing apparatus includes a setting unit (for example, a timer setting unit 32 shown in FIG. 3) adapted to receive the specification information transmitted from the information management apparatus and set the timing condition of next polling communication such that the next polling communication is performed when timing condition specified by the received specification information is met, and a requesting unit (for example, a polling communication controller 31 shown in FIG. 3) adapted to start polling communication when the timing condition set by the setting unit is met thereby to request the provision of specification information specifying the timing condition of further next polling communication.

Figure 5:
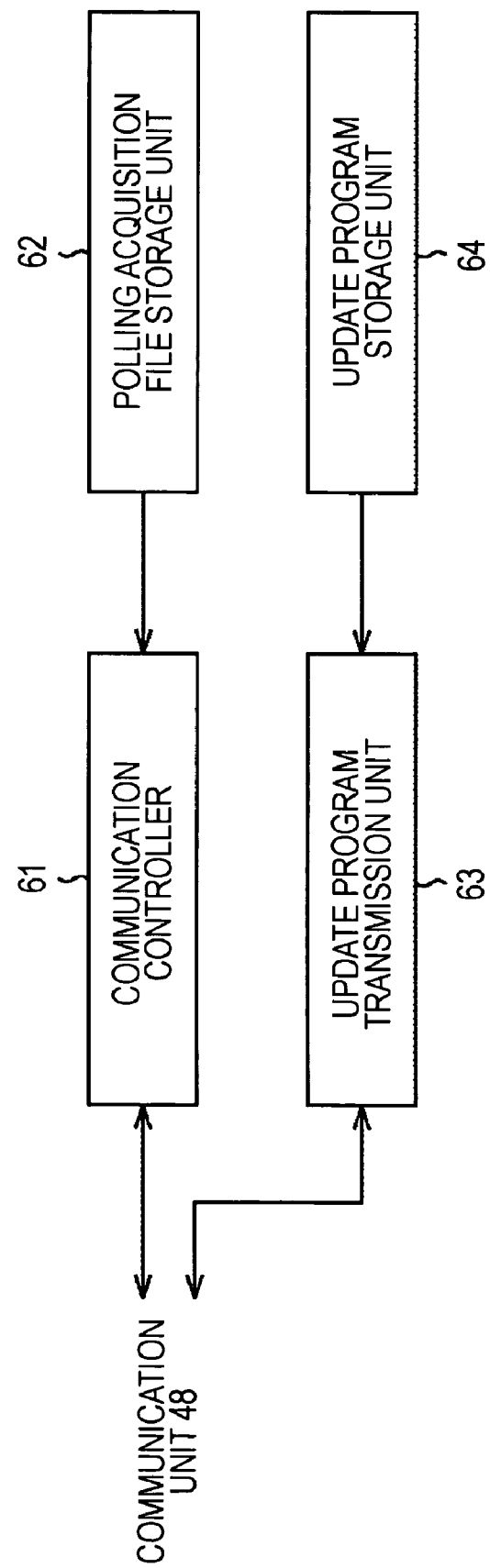
FIG. 5 is a block diagram illustrating an example of a functional configuration of a polling server 2.

According to an embodiment of the present invention, there is provided an information management apparatus (for example, a polling server 2 shown in FIG. 1) adapted to communicate with an information processing apparatus by responding to a request transmitted from the information processing apparatus via polling communication, including a storage unit (for example, a polling acquisition file storage unit 62 shown in FIG. 5) adapted to store specification information including information specifying a timing condition of polling communication, and a transmitting unit (for example, a communication controller 61 shown in FIG. 5) adapted to transmit the specification information stored in the storage unit to the information processing apparatus, in response to the request from the information processing apparatus, the transmitting unit being adapted to transmit the specification information stored in the storage unit to the information processing apparatus each time polling communication is performed, when the timing condition specified in current specification information is met, by the information processing apparatus to issue a request for specification information.

According to an embodiment of the present invention, there is provided an information management method including the steps of storing specification information including information specifying a timing condition of polling communication, and transmitting the stored specification information, in response to a request from an information processing apparatus, wherein transmission of the stored specification information to the information processing apparatus is performed each time polling communication is performed, when the timing condition specified in current specification information is met, by the information processing apparatus to issue a request for specification information (for example, in step S12 shown in FIG. 6).

According to an embodiment of the present invention, there is provided an information processing apparatus (for example, a client 1A shown in FIG. 1) adapted to communicate with an information management apparatus (for example, a polling server 2 shown in FIG. 1) having specification information including information specifying a timing condition of polling communication, including a setting unit (for example, a timer setting unit 32 shown in FIG. 3) adapted to receive the specification information transmitted from the information management apparatus and set the timing condition of next polling communication such that the next polling communication is performed when the timing condition specified by the received specification information is met, and a requesting unit (for example, a polling communication controller 31 shown in FIG. 3) adapted to start polling communication when the timing condition set by the setting unit is met thereby to request the provision of specification information specifying the timing condition of further next polling communication.

The information processing apparatus may further include an update control unit (for example, an update controller 34 shown in FIG. 3) adapted to control updating of the program such that if the list transmitted from the information management apparatus in response to the request issued by the requesting unit indicates that an update program for use by the information processing apparatus is available from the information management apparatus, then the update control unit requests the information management apparatus to provide the update program and updates the program in accordance with the update program transmitted from the information management apparatus in response to the request.

According to an embodiment of the present invention, there is provided an information processing method including the steps of receiving specification information transmitted from an information management apparatus, setting the timing condition of next polling communication such that the next polling communication is performed when timing condition specified by the specification information is met, and starting polling communication when the timing condition set by the setting unit is met thereby to request the provision of specification information specifying the timing condition of further next polling communication (for example, in step S2 shown in FIG. 6).

The present invention is described in further detail below with reference to embodiments in conjunction with the accompanying drawings.

FIG. 1 is a diagram illustrating an example of a communication system according to an embodiment of the present invention.

In FIG. 1, the communication system includes a polling server 2 and a plurality of clients 1A to 1H connected to the polling server 2 via the Internet 3.

The clients 1A to 1H are, for example, digital recording apparatuses such as a hard disk recorder capable of recording contents such as a television program contents, playing back recorded contents, and communicating with the polling server 2. Hereinafter, when it is not needed to distinguish among the clients 1A to 1H, a generic expression "client(s) 1" will be used.

In a period in which polling communication is allowed, each client 1 periodically performs the polling communication at predetermined intervals, for example, once every day, every ten minutes, etc., to request the polling server 2 to transmit information as represented by an open arrow #1 in FIG. 1. The polling server 2 has an IP address assigned thereto. On the basis of the IP address, the client 1 performs polling communication with the polling server 2.

For example, the client 1 requests the polling server 2 to transmit a list of update programs by which to update a program used by the client 1 and polling communication interval specification information including information which specifies an interval of polling communication. Note that computer programs executed by clients will be referred to simply as programs unless distinguishing from TV programs is necessary. That is, in the communication system shown in FIG. 1, the program used on the client 1 is automatically updated via the polling communication performed by the client 1. The polling server 2 is managed by an administrator such as a manufacturer or a seller of the clients 1.

If the polling server 2 receives the request from the client 1, the polling server 2 transmits the update program list and the polling communication interval specification information described in the polling acquisition file managed by the polling server 2 to the client 1 as represented by an open arrow #2 in FIG. 1.

If the client 1 receives the update program list and the polling communication interval specification information transmitted from the polling server 2, the client 1 analyzes the content of the received update program list and performs a process depending on the content of the received update program list.

More specifically, for example, on the basis of the type/model of the client 1, the version of the program used by the client 1, etc., the client 1 checks the update program list to determine whether a new update program for the client 1 is available from the polling server 2. If so, the client 1 requests the polling server 2 to transmit the update program. If the client 1 receives the update program transmitted in response to the request, the client 1 installs the received update program thereby updating the program.

The client 1 sets the timing condition of next polling communication in accordance with the polling communication interval specification information received together with the update program list from the polling server 2.

For example, in a case where the polling communication interval specification information specifies that polling communication should be performed at intervals of 10 minutes, the client 1 sets the timing condition of the next polling communication such that the next polling communication starts 10 minutes after a reference time such as a time at which latest polling communication was performed or a time at which the update program list and the polling communication interval specification information were received.

The specified polling communication interval can be longer or shorter than or equal to the previous interval set in the client 1. The description in the polling acquisition file is rewritable, and the specified interval to the next polling communication can change depending on the specified timing condition of polling communication.

In a case where the polling communication interval specification information specifies that polling communication should be performed when a particular time of a particular day is reached, the client 1 sets the timing condition of next polling communication such that the next polling communication starts when the specified time of the specified data is reached.

As described above, by properly describing a combination of a date/time and a polling communication interval in the polling communication interval specification information, it is possible to specify a period during which the polling communication is disabled or enabled.

When the time specified as the next polling communication timing is reached, the client 1 performs the polling communication to the polling server 2 to request transmission of information. Thereafter, a similar process is performed repeatedly between the client 1 and the polling server 2.

As described above, simply by providing the polling acquisition file in the polling server 2, it becomes possible for the client 1 to set the polling communication timing such that next polling communication is performed at the time specified by the polling communication interval specification information. This makes it possible for the administrator of the polling server 2 to easily control the timing of polling communication performed by the client 1 so that communication traffic is controlled depending on the status of the polling server 2.

In the communication system shown in FIG. 1, the polling communication interval specification information may be described such that the client 1 sets the polling communication mode into the inactive mode in which no further polling communication is performed. If a polling communication re-activation command is manually input by as user, the inactive mode is released into an active mode in which polling communication is allowed.

Specific examples of sequences of processing steps performed by the client 1 and the polling server 2 will be described later with reference to flow charts.

Figure 2:
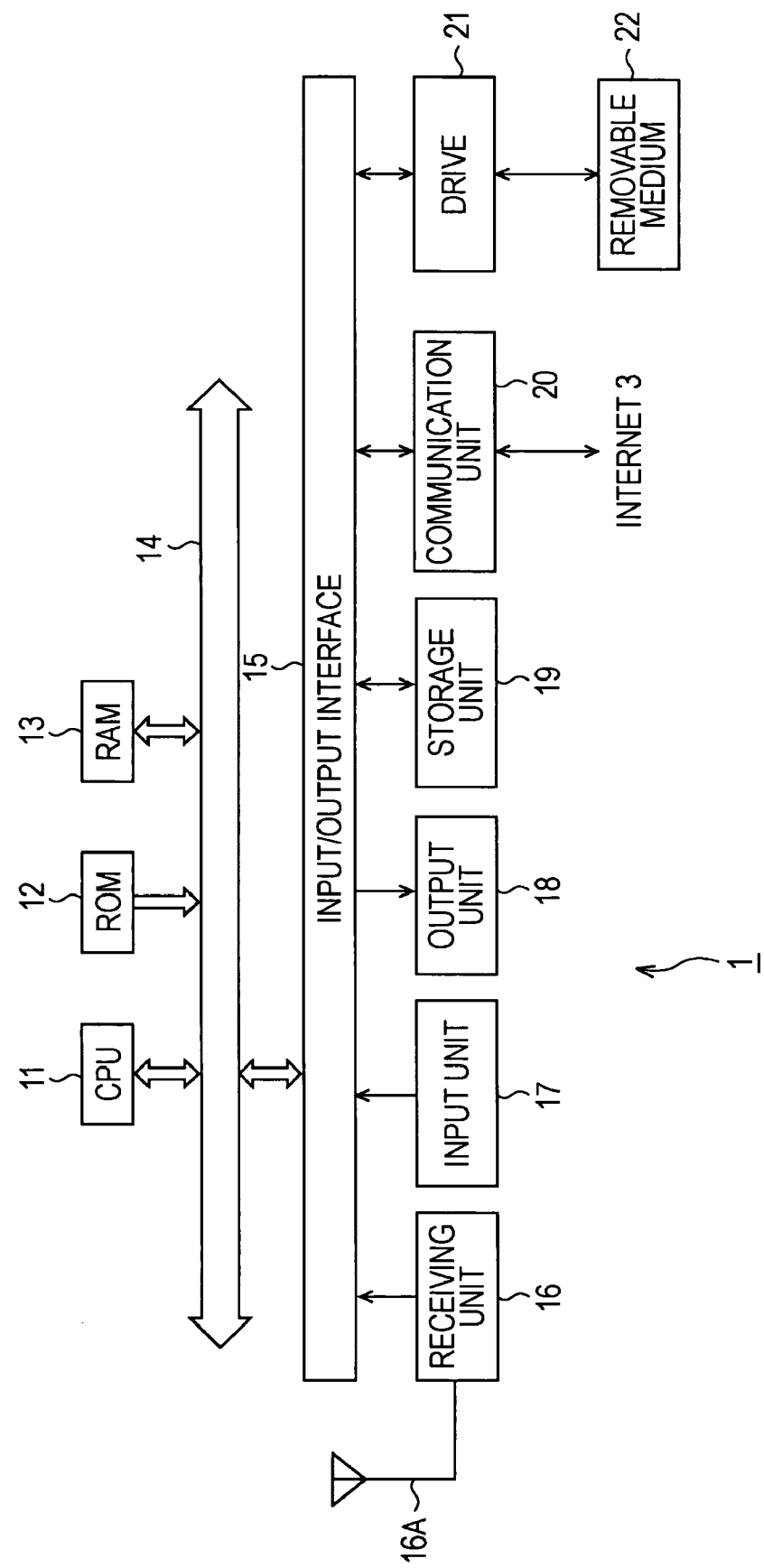
FIG. 2 is a block diagram illustrating an example of a hardware configuration of a client.

FIG. 2 is a block diagram illustrating an example of a hardware configuration of the client 1.

A CPU (Central Processing Unit) 11 performs various processes in accordance with a program stored in a ROM (Read Only Memory) 12 or a storage unit 19. A RAM (Random Access Memory) 13 stores a program executed by the CPU 11 and also stores data used in the execution of the program. The CPU 11, the ROM 12, and the RAM 13 are connected to each other via a bus 14.

An input/output interface 15 is connected to the CPU 11 via the bus 14. The input/output interface 15 is connected to a receiving unit 16, an input unit 17, an output unit 18, a storage unit 19, a communication unit 20, and a drive 21.

The receiving unit 16 receives a broadcast wave signal via an antenna 16A and demodulates it into MPEG-TS (Moving Picture Experts Group-Transport Stream) data. The receiving unit 16 extracts TV program data specified to be recorded from the MPEG-TS, and supplies the extracted data to the storage unit 19 via the input/output interface 15.

The input unit 17 receives a signal transmitted from a remote controller, and outputs information indicating the content of an operation performed by a user to the CPU 11 via the input/output interface 15 and the bus 14.

The output unit 18 decodes the data of the TV program specified to be played back, and outputs a resultant video signal to a television set connected to the client 1 so that an image of the TV program is displayed on the television set.

The storage unit 19 is implemented using, for example, a hard disk, and is used to store a program executed by the CPU 11 and various data of TV programs supplied from the receiving unit 16 via the input/output interface 15. The program stored in the storage unit 19 is updated according to the update program provided from the polling server 2.

The communication unit 20 communicates with the polling servers 2 via the Internet 3. The communication unit 20 acquires data of TV programs broadcast via the Internet 3, and transfers the acquired data to the storage unit 19 via the input/output interface 15 thereby storing the data in the storage unit 19.

When a removable medium 22 such as a magnetic disk, an optical disk, a magneto-optical disk, or a semiconductor memory is mounted on the drive 21, a program and/or data are read from the removable medium 22 mounted on the drive 21. The acquired program or data is transferred, as required, to the storage unit 19 and stored therein.

Figure 3:
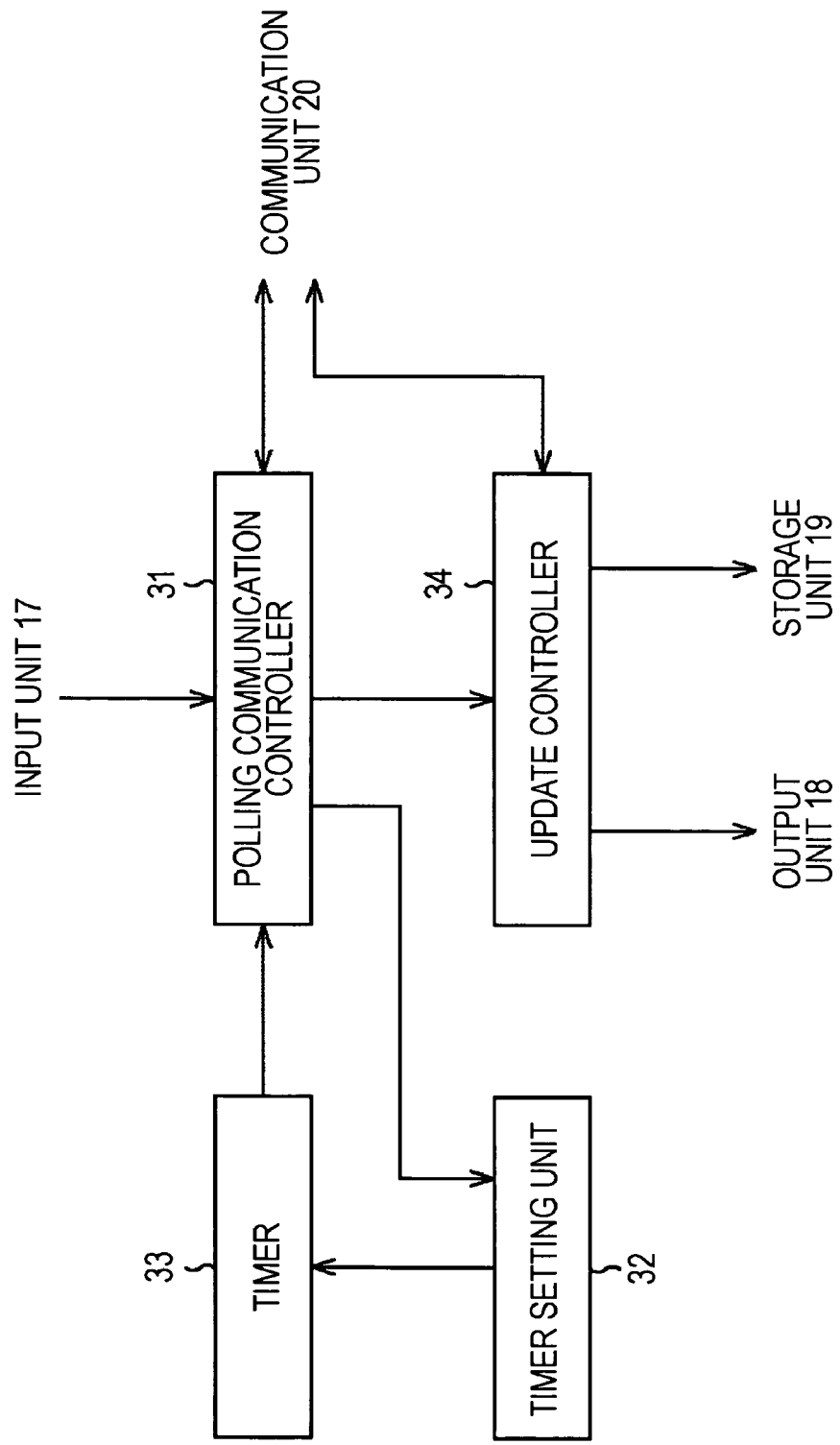
FIG. 3 is a block diagram illustrating an example of a functional configuration of a client.

FIG. 3 is a block diagram illustrating an example of a functional configuration of the client 1. The functional blocks shown in FIG. 3 are, at least partially, realized by executing a program on the CPU 11 shown in FIG. 2.

As shown in FIG. 3, the client 1 is configured to include a polling communication controller 31, a timer setting unit 32, a timer 33, and an update controller 34.

The polling communication controller 31 controls the communication unit 20 to communicate with the polling server 2.

If the polling communication controller 31 receives a start signal from the timer 33, the polling communication controller 31 performs polling communication with the polling server 2 to request the polling server 2 to transmit an update program list and polling communication interval specification information described in a polling acquisition file. In accordance with the request, the polling server 2 transmits the update program list and the polling communication interval specification information. If the polling communication controller 31 receives them, the polling communication controller 31 transfers the received polling communication interval specification information to the timer setting unit 32, and the update program list to the update controller 34.

In a state where the polling communication is deactivated, if the polling communication controller 31 receives a command, input by a user via the input unit 17, indicating that the polling communication should be activated, the polling communication controller 31 performs the polling communication with the polling server 2 in accordance with the command to request the polling server 2 to transmit the update program list and the polling communication interval specification information, in a similar manner to the case where polling communication in performed in response to the start signal supplied from the timer 33. If the polling communication controller 31 receives the update program list and the polling communication interval specification information transmitted in response to the request, the polling communication controller 31 transfers the received polling communication interval specification information to the timer setting unit 32, and the update program list to the update controller 34.

The timer setting unit 32 analyzes the polling communication interval specification information supplied from the polling communication controller 31, and sets the timer 33 according to the specified timing condition of next polling communication.

For example, in a case where the polling communication interval specification information specifies that polling communication should be performed at intervals of 10 minutes, the timer setting unit 32 sets the timer 33 such that the next polling communication will be performed 10 minutes after a particular reference time. On the other hand in a case where the polling communication interval specification information specifies that next polling communication should be performed after a particular time of a particular day, the timer setting unit 32 sets the timer 33 such that the next polling communication will be performed after the specified particular time of the specified particular day.

In a state in which no polling communication interval specification information has been yet acquired from the polling server 2, as in a state immediately after shipment, the timer setting unit 32 sets the timer 33 such that the next polling communication will be performed a default time after a particular reference time.

In a case where the polling communication interval specification information specifies that the polling communication is deactivated, the timer setting unit 32 deactivates the polling communication without making the setting associated with the next timing of polling communication.

The timer 33 is configured to operate in accordance with the timing condition of the next polling communication set by the timer setting unit 32. More specifically, if the timer 33 detects that the time specified by the timer setting unit 32 is reached, the timer 33 outputs a start signal to the polling communication controller 31 thereby to control the polling communication controller 31 to start the polling communication.

The update controller 34 analyzes the update program list supplied from the polling communication controller 31 to determine whether the polling server 2 has a new update program available for use by the client 1. The update controller 34 controls the output unit 18 to display a message on the television set to notify a user that a new update program is or is not available from the polling server 2.

In a case where the update controller 34 determines that a new update program is available, the update controller 34 controls the communication unit 20 to request the polling server 2 to transmit the update program. If the update program is received, the update controller 34 stores it in the storage unit 19 and installs the update program.

Figure 4:
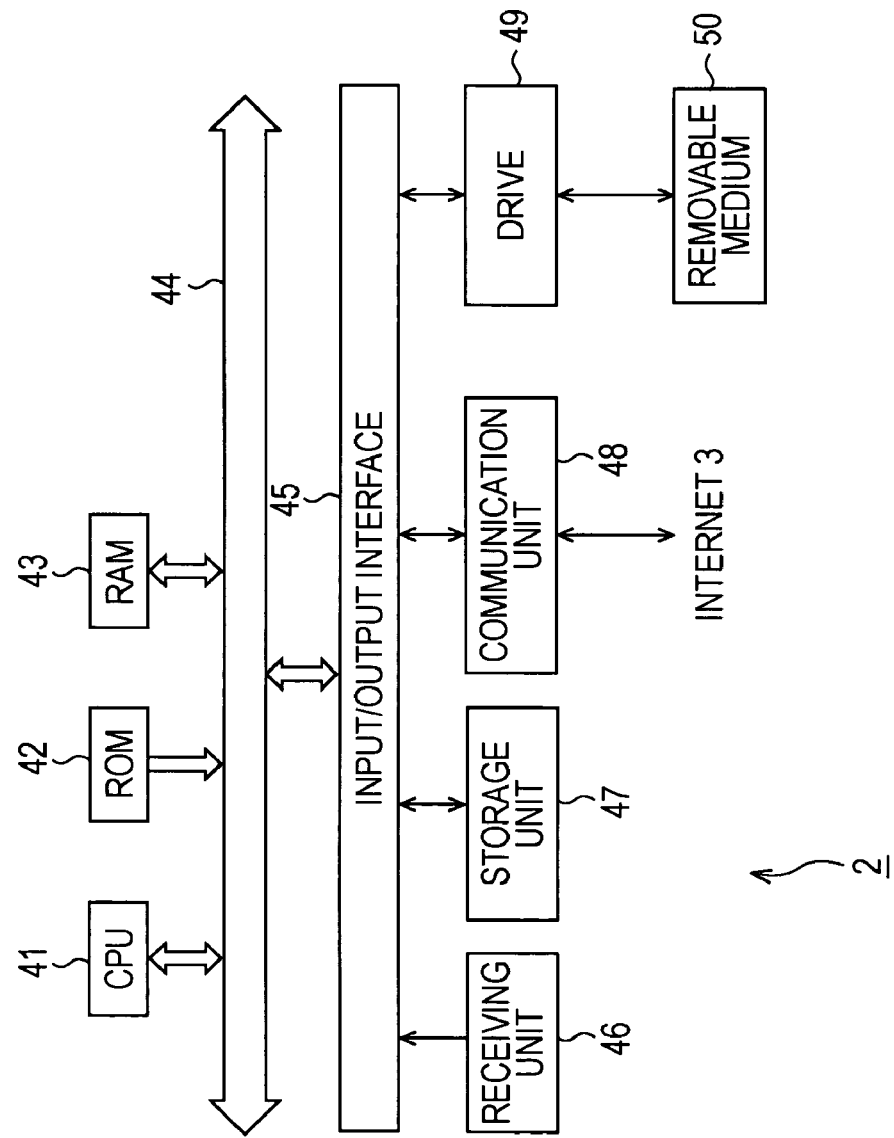
FIG. 4 is a block diagram illustrating an example of a hardware configuration of a polling server.

FIG. 4 is a block diagram illustrating an example of a hardware configuration of the polling server 2.

A CPU 41 performs various processes in accordance with a program stored in a ROM 42 or a storage unit 47. A RAM 43 stores a program executed by the CPU 41 and also stores data used in the execution of the program. The CPU 41, the ROM 42, and the RAM 43 are connected to each other via a bus 44.

An input/output interface 45 is connected to the CPU 41 via the bus 44. The input/output interface 45 is connected to an input unit 46, a storage unit 47, a communication unit 48, and a drive 49.

The input unit 46 outputs information indicating the content of an operation performed on the input unit 46 by a user (an administrator of the polling server 2) to the CPU 41 via the input/output interface 45 and the bus 44. For example, the content of the polling acquisition file is described by the administrator of the polling server 2 by operating the input unit 46.

The storage unit 47 is implemented using, for example, a hard disk, and is used to store the program executed by the CPU 41. The storage unit 47 is also used to store the polling acquisition file and the update program provided to the client 1.

The communication unit 48 is configured to receive a request from the client 1 via polling communication and communicate with the client 1 via the Internet 3.

When a removable medium 50 is mounted on the drive 49, an update program to be provided to the client 1 is read from the removable medium 50 mounted on the drive 49. The acquired update program is transferred, as required, to the storage unit 47 and stored therein.

FIG. 5 is a block diagram illustrating an example of a functional configuration of the polling server 2. The functional blocks shown in FIG. 5 are, at least partially, realized by executing a program on the CPU 41 shown in FIG. 4.

As shown in FIG. 5, the polling server 2 is configured in include a communication controller 61, a polling acquisition file storage unit 62, an update program transmission unit 63, and an update program storage unit 64.

The communication controller 61 controls the communication unit 48 to receive a request from the client 1 via polling communication. In accordance with the request from the client 1, the communication controller 61 transmits, to the client 1, the update program list and the polling communication interval specification information described in the polling acquisition file stored in the polling acquisition file storage unit 62.

The polling acquisition file storage unit 62 is configured to store the polling acquisition file. The polling acquisition file stored in the polling acquisition file storage unit 62 is rewritten, as required, by an administrator of the polling server 2.

If the update program transmission unit 63 receives a request for an update program from the client 1, the update program transmission unit 63 reads the requested update program from the update program storage unit 64 and transmits it to the client 1.

The update program storage unit 64 is adapted to store update programs input to the polling server 2 under the control of the administrator of the polling server 2.

Next, a process performed by the client 1 and the polling server 2 configured in the above described manner is described below with reference to a flow chart shown in FIG. 6.

This process is started when the time specified as the next polling communication timing is reached. Note that the next polling communication timing is set in accordance with the polling communication interval specification information acquired by the client 1 in previous polling communication. More specifically, when the time specified as the next polling communication timing is reached, the timer 33 outputs a start signal to the polling communication controller 31 thereby to start the polling communication.

In step S1, the polling communication controller 31 of the client 1 starts its operation in response to a start signal supplied from the timer 33.

In step S2, the polling communication controller 31 performs the polling communication to the polling server 2. In the polling communication, a request command is transmitted to the polling server 2 together with an ID assigned to the client 1 to request the polling server 2 to provide the update program list and the polling communication interval specification information described in the polling acquisition file.

In step S11, the communication controller 61 of the polling server 2 receives the request sent from the client 1.

In step S12, the communication controller 61 transmits, to the client 1, the update program list and the polling communication interval specification information described in the polling acquisition file stored in the polling acquisition file storage unit 62.

In step S3, if the polling communication controller 31 of the client 1 receives the update program list and the polling communication interval specification information transmitted from the polling server 2, the polling communication controller 31 transfers the received polling communication interval specification information to the timer setting unit 32, and the update program list to the update controller 34.

In step S4, the update controller 34 analyzes the update program list supplied from the polling communication controller 31 and performs a process depending on the content of the received update program list. For example, in the case where the polling server 2 has a new update program available for use by the client 1, the update controller 34 requests the polling server 2 to transmit the update program. If the update program is received, the update controller 34 stores it in the storage unit 19 and installs the update program.

In step S5, the timer setting unit 32 analyzes the polling communication interval specification information supplied from the polling communication controller 31 and sets the timer 33 so as to detect the arrival of a time at which next polling communication is specified to be performed. Thereafter, the processing flow returns to step S1 to repeat the process described above.

For example, in a case where the value newly specified as the polling communication interval is longer or shorter than the previous value, the next polling communication is performed when the newly specified time has elapsed, to acquire the update program list and the polling communication interval specification information.

On the other hand, in a case where it is specified that the next polling communication should be performed after a particular time of a particular day is reached, the next polling communication is performed after the specified particular time of the specified particular day is reached, to acquire the update program list and the polling communication interval specification information.

As described above, the administrator of the polling server 2 can easily control the polling communication performed by the client 1.

For example, when frequent communication is not necessary, the polling communication interval is expanded thereby to reduce the load imposed on the polling server 2 thereby increasing the number of clients 1 handled by the polling server 2. This makes it possible to increase the number of clients 1 without having to replace the current polling server 2 with one having higher performance, and thus it is possible to reduce the operation cost.

For example, in a case where the client 1 is one of new products, it is necessary to provide update programs to the client 1 via polling communication at rather short intervals for a certain period after release. However, after a few years have elapsed since the release, frequent polling communication is no longer necessary, and thus the polling communication interval is reduced.

On the other hand, in a case where it is necessary to provide the client 1 with urgent information such as an update program for handling a security hole detected in the program used by the client 1 or an update program for protection from new computer virus, the polling communication interval is reduced to reduce the total time taken to transmit the urgent information to all clients 1 thereby to assure high security/performance.

It is also possible to control the polling communication from the client 1 such that the polling communication is allowed after a particular date/time. This capability makes it possible to temporarily disable polling communication for a particular period during which the administrator of the polling server 2 is allowed to perform maintenance of the apparatus used as the polling server 2, or a modification for enhancement in performance.

By disabling the polling communication during the specified period in which the maintenance of the polling server 2 is performed, it is possible to prevent the client 1 from having an error in polling communication which would otherwise occur. Occurrences of error can cause the user of the client 1 to have unnecessary distrust. In other words, prevention of errors can assure user's trust in systems or apparatuses.

By specifying a date/time at which next polling communication is allowed, in accordance with a date/time at which the polling server 2 starts providing a new service, it becomes possible to prevent the client 1 from performing polling communication before the provision of the service is started. In a particular period after the start of the provision of the service, the polling communication interval may be set to be short enough to quickly provide the service.

The administrator of the polling server 2 can properly set a combination of the polling communication interval and the period during which the polling communication is allowed thereby to properly manage the operation of the system.

Next, referring to a flow chart shown in FIG. 7, another example of a process performed by the client 1 and the polling server 2 is described. In this process described below, the client 1 deactivates the polling communication in accordance with the polling communication interval specification information acquired from the polling server 2.

In step S21, the polling communication controller 31 of the client 1 starts its operation in response to a start signal supplied from the timer 33.

In step S22, the polling communication controller 31 performs the polling communication with the polling server 2. In the polling communication, the polling communication controller 31 sends a request command to the polling server 2 together with an ID to request the polling server 2 to provide the update program list and the polling communication interval specification information.

In step S31, the communication controller 61 of the polling server 2 receives the request sent from the client 1.

In step S32, the communication controller 61 transmits, to the client 1, the update program list and the polling communication interval specification information described in the polling acquisition file. Note that the polling communication interval specification information provided in this specific case includes information instructing that the polling communication should be deactivated.

In step S23, if the polling communication controller 31 of the client 1 receives the update program list and the polling communication interval specification information transmitted from the polling server 2, the polling communication controller 31 transfers the received polling communication interval specification information to the timer setting unit 32, and the update program list to the update controller 34.

In step S24, the update controller 34 analyzes the update program list supplied from the polling communication controller 31 and performs a process depending on the content of the received update program list.

In step S25, the timer setting unit 32 analyzes the polling communication interval specification information supplied from the polling communication controller 31 and deactivates the polling communication in accordance with the polling communication interval specification information. The process is then ended. The timer 33 remains in this deactivated state in which the timer 33 outputs no start signal, until the timer setting unit 32 sets a time at which polling communication is performed again.

As described, in the communication system shown in FIG. 1, by controlling the content of the polling acquisition file, it is possible to disable the polling communication by the client 1.

In the state in which the polling communication by the client 1 is disabled, no polling communication is performed until an enable command is issued by a user. For example, when it is desirable to reduce the frequency of polling communication from the client 1, the administrator of the polling server 2 is allowed to disable the polling communication. In this case, the polling server 2 estimates the number of clients 1 likely to perform polling communication to the polling server 2 (that is, the number of clients 1 that are not yet disabled in terms of the polling communication), and the polling server 2 reduces the capacity of the apparatus used as the polling server 2 to an optimum level so that service can be provided in a highly efficient manner, or service is closed as required.

In a case where the capability of disabling the polling communication as required is not provided, when the polling server 2 is removed, the client 1 still performs polling communication to the IP address which was used but is no longer used by the polling server 2. If this IP address is assigned to another different server, the server will receive unexpected polling communication, which results in a reduction in utility value of the IP address. The problem can be avoided by the capability of disabling the polling communication as required.

Next, referring to a flow chart shown in FIG. 8, still another example of a process performed by the client 1 and the polling server 2 is described. In this process described below, the client 1 re-activates the polling communication from the inactive state in accordance with a command issue by a user.

In step S41, the polling communication controller 31 starts its operation in response to the command issued by the user. When the polling communication reactivation command is issued by the user, information indicating this fact is supplied to the polling communication controller 31 via the input unit 17.

In step S42, the polling communication controller 31 performs the polling communication with the polling server 2. In the polling communication, the polling communication controller 31 sends a request command to the polling server 2 together with an ID to request the polling server 2 to provide the update program list and the polling communication interval specification information.

In step S51, the communication controller 61 of the polling server 2 receives the request from the client 1.

In step S52, the communication controller 61 transmits, to the client 1, the update program list and the polling communication interval specification information described in the polling acquisition file.

In step S43, the polling communication controller 31 of the client 1 receives the update program list and the polling communication interval specification information transmitted from the polling server 2, and the polling communication controller 31 transfers the received polling communication interval specification information to the timer setting unit 32, and the update program list to the update controller 34.

In step S44, the update controller 34 analyzes the update program list supplied from the polling communication controller 31.

In the case where the update program list indicates that the polling server 2 has a new update program for use by the client 1, then, in step S45, the update controller 34 displays a message on the television set to indicate that the update program is available from the polling server 2. An example of the message is "Available update program is detected. The update program is going to be downloaded and updating is performed."

On the other hand, in a case where the update program list indicates that the polling server 2 has no new update program for use by the client 1, then the update controller 34 displays a message on the television set to indicate that no update program is available from the polling server 2. An example of the message is "System is of the latest version."

In step S46, the update controller 34 performs a process depending on the content of the received update program list. For example, in the case where the polling server 2 has a new update program available for use by the client 1, the update controller 34 requests the polling server 2 to transmit the update program. If the update program is received, the update controller 34 stores it in the storage unit 19 and installs the update program.

In step S47, the timer setting unit 32 analyzes the polling communication interval specification information supplied from the polling communication controller 31 to detect the next time at which polling communication should be performed. The timer setting unit 32 sets the timer 33 according to the detection result. The current process is then ended.

The following process performed by the client 1 and the polling server 2 is similar to that described above with reference to FIG. 6. That is, when the time specified as the next polling communication start time is reached, the timer 33 outputs a start signal to the polling communication controller 31. In response to the start signal, the polling communication controller 31 starts the polling communication.

As described above, when the polling communication is in the deactivated state, if polling communication is once performed in response to a command issued by a user, the timing condition of the next polling communication is set in accordance with the polling communication interval specification information acquired in the current polling communication. Thus, polling communication is performed repeatedly by the client 1 without needing an operation by the user.

Thus, the user of the client 1 is allowed to easily re-activate the polling communication being currently in the deactivated state, without having to set the polling communication interval.

Thus, it is possible to minimize the disadvantage which may occur during the period in which the polling communication is deactivated.

For example, in the case where automatic updating of the program used by the client 1 is performed via the polling communication, it is ideal to terminate the polling communication when the development of the update program has been completed. However, in practice, there is a possibility that necessity of providing a further update program occurs, for example, to support new standards or to handle virus or the like, after the completion of the development of the update program.

To handle the above-described possibility, the polling communication is disabled once when the development of the update program is completed, and the polling communication is re-enabled if necessity of provision of a further update program occurs thereafter. This makes it possible to allow the client 1 to perform the polling communication only during a particular period in which an update program is available, and thus the operation time and the operation cost can be reduced compared with the case in which the polling server 2 is operated regardless of the situation. When a user is notified via a particular medium that an update program is available, the user issues a polling communication re-activation command.

In the embodiments described above, it is assumed that the polling communication by the client 1 is for automatic updating of the program. However, the purpose of the polling communication is not limited to that, but polling communication may be performed for any other purpose, as long as providing of information is periodically requested via polling communication to the polling server 2, and the client 1 performs a process in accordance with the information provided in response to the request.

Furthermore, the polling server 2 does not necessarily need to have only one polling acquisition file, but the polling server 2 may have a plurality of polling acquisition files. In this case, the client 1 may specify particular polling communication interval specification information described in a particular one of the plurality of polling acquisition files to be provided from the polling server 2. Alternatively, the polling server 2 may select a polling acquisition file. A plurality of pieces of polling communication interval specification information may be described in a single polling acquisition file.

In the embodiments described above, the polling communication is activated from the inactive state in response to the polling communication re-activation command issued by a user. Alternatively, the polling communication re-activation command or information corresponding to the polling acquisition file may be supplied to the client 1, for example, via digital broadcast or via a removable medium thereby to re-enable the polling communication.

The sequence of processing steps described above may be performed by hardware or software. When the processing sequence is executed by software, the software in the form of a program may be installed in a computer provided as dedicated hardware or may be installed onto a general-purpose computer capable of performing various processes in accordance with various programs installed therein.

The program to be installed may be provided in the form of a package. More specifically, for example, the program may be stored on the removable medium 22 shown in FIG. 2 such as a magnetic disk, an optical disk, a magneto-optical disk, or a semiconductor memory, and the program may be installed from the removable medium 22. Alternatively, the program may be provided via a wireless or wire transmission medium such as a local area network, the Internet, or digital satellite broadcast. The program may be preinstalled in the ROM 12 or the storage unit 19.

The program may be executed by the computer sequentially in a step-by-step manner in the same order as the order of steps described above in the embodiments, or steps of the program may be executed in parallel. Alternatively, any part of the program may be executed at a particular time as required.

The present invention has been described above with reference to particular embodiments. It should be understood by those skilled in the art that various modifications, combinations, sub-combinations and alterations may occur depending on design requirements and other factors insofar as they are within the scope of the appended claims or the equivalents thereof.

What is claimed is:

1. A communication system including an information management apparatus and an information processing apparatus, the information processing apparatus being adapted to issue a request to the information management apparatus via polling communication, and the information management apparatus being adapted to respond to the request thereby achieving communication between the information processing apparatus and the information management apparatus,
   wherein the information management apparatus includes:
      a storage unit to store specification information, the specification information including information specifying one of a timing condition for the polling communication and an indication that the polling communication should be deactivated; and
      a transmitting unit to transmit the specification information stored in the storage unit to the information processing apparatus in response to the request from the information processing apparatus,
      wherein the transmitting unit is configured to transmit the specification information stored in the storage unit to the information processing apparatus each time the request is received from the information processing apparatus,
   and the information processing apparatus includes:
      a setting unit to set, in response to receiving from the information management apparatus first specification information specifying the timing condition for the polling communication, the timing condition of a next polling communication such that the next polling communication is performed when the timing condition specified by the received specification information is met and to deactivate the polling communication in response to receiving from the information management apparatus second specification information specifying that the polling communication should be deactivated;
      an interface unit to receive an instruction from a user of the information processing apparatus to activate the polling communication, when the polling communication is deactivated;
      a requesting unit to transmit the request when the timing condition set by the setting unit is met and when the polling communication is not deactivated and to transmit the request when the polling communication is deactivated and the instruction to activate the polling communication is received from the user;
      a second storage unit to store at least one piece of updatable information; and
      a specification information determining unit to set the specification information, the specification information being determined based on whether the at least one piece of updatable information will be updated and/or an assessment of when the at least one piece of updatable information will be updated;
   wherein the at least one piece of updatable information comprises an update for a computer program,
   wherein, when the computer program is a new product, during a first length of time after the computer program is released, the specification information determining unit is configured to determine the specification information specifying a first value as timing condition for the polling communication; and
   wherein, when the computer program is a new product, at a second time after the first length of time, the specification information determining unit is configured to determine the specification information specifying a second value as timing condition for the polling communication, the second value longer than the first value, or to determine the specification information specifying that the polling communication should be deactivated.

2. An information management apparatus to communicate with an information processing apparatus by responding to a request transmitted from the information processing apparatus via polling communication, the information management apparatus comprising:
   a first storage unit to store at least one piece of updatable information;
   a specification information determining unit to set specification information, the specification information being determined based on whether the at least one piece of updatable information will be updated and/or an assessment of when the at least one piece of updatable information will be updated;
   a second storage unit to store the specification information, the specification information including information specifying one of a timing condition for the polling communication and an indication that the polling communication should be deactivated; and
   a transmitting unit to transmit the specification information stored in the second storage unit to the information processing apparatus, in response to the request from the information processing apparatus, the request being a request for the at least one piece of updatable information,
   wherein the transmitting unit is configured to transmit the specification information stored in the second storage unit to the information processing apparatus each time the request is received from the information processing apparatus;
   wherein the at least one piece of updatable information comprises an update for a computer program, and
   wherein, when the computer program is a new product, during a first length of time after the computer program is released, the specification information determining unit is configured to determine the specification information specifying a first value as timing condition for the polling communication; and wherein when the computer program is a new product, at a second time after the first length of time, the specification information determining unit is configured to determine the specification information specifying a second value as timing condition for the polling communication, the second value longer than the first value, or to determine the specification information specifying that the polling communication should be deactivated.

3. The communication system of claim 1, wherein the requesting unit of the information processing apparatus is configured to transmit a request for the at least one piece of updatable information.

4. The communication system of claim 1, wherein the information processing apparatus is a set-top television box, the computer program is a firmware for the set-top television box, and the update for the computer program is an update for the firmware.

5. The communication system of claim 1, wherein the specification information determining unit is configured to set the specification information based on input from an administrator.

6. The communication system of claim 1, wherein the requesting unit of the information processing apparatus transmits the request comprising a first request for the specification information.

7. The information management apparatus of claim 2, wherein the request comprises a request for the specification information and wherein the transmitting unit transmits the specification information in response to the request for the specification information.

* * * * *